2,837,399
Patented June 3, 1958

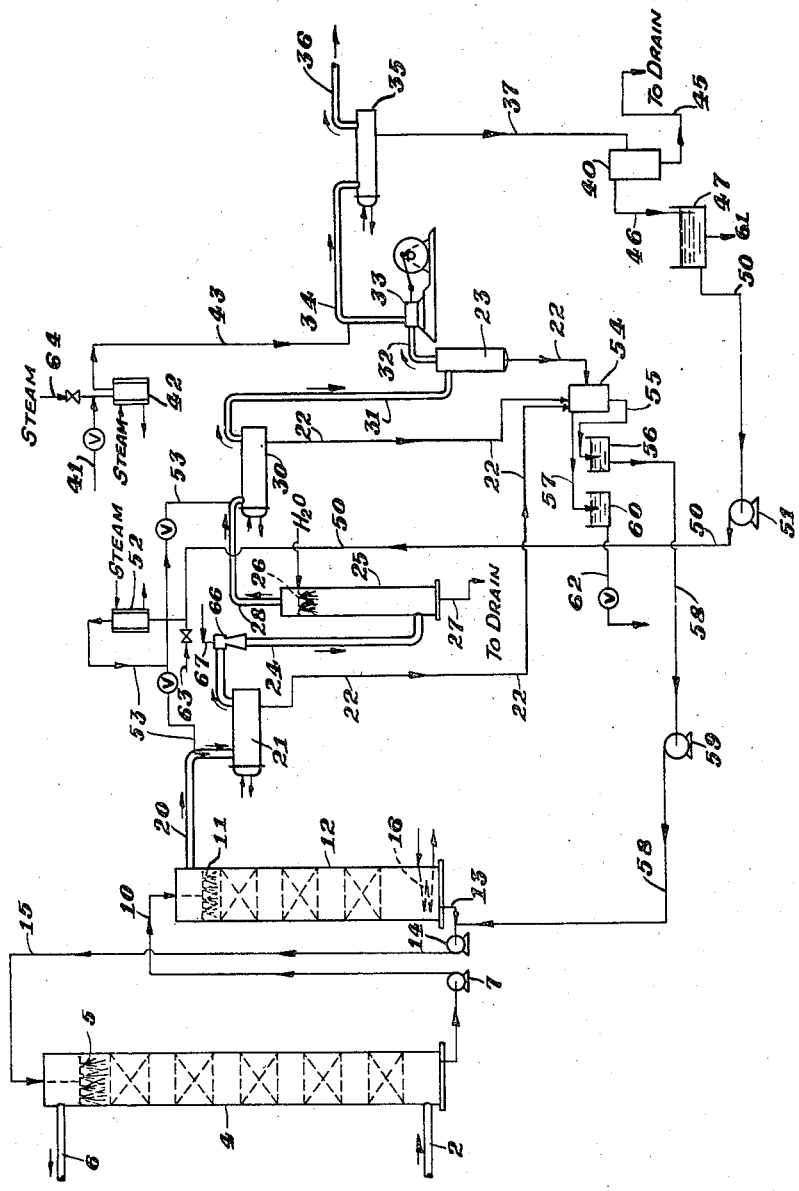

2,837,399

SEPARATION OF ACID GASES FROM COAL CARBONIZATION GASES

Herbert A. Gollmar and Walter M. Africa, Pittsburgh, Pa., assignors to Koppers Company, Inc., a corporation of Delaware Application November 22, 1954, Serial No. 470,450

3 Claims. (Cl. 23—3)

This invention relates to the separation of acid gases, such as hydrogen sulfide, hydrogen cyanide and carbon dioxide from gases containing them, for example, coal-carbonization gases.

One well known method for separation of acidic vapors from gases, particularly those that may still also contain small amounts of ammonia is the hot-vacuum-actification process. The hot-vacuum-actification process of separating acid gases from, for example, coke oven gases, comprises broadly—absorbing the acid gases such as $H_2S$, HCN and $CO_2$ in an alkali-metal carbonate solution in a scrubber, then heating the alkaline solution under a high vacuum in an actifier to drive the acid gases out of the absorption solution. At the same time the absorption solution is regenerated so that the solution may be returned to the scrubber in a closed cycle. This hot-vacuum-actification process is described in detail in the patent to Sperr 1,533,773, issued April 14, 1925.

An alkaline metal carbonate solution generally is employed to absorb the acid gases from the gas, and when the fouled solution is heated under a vacuum to remove the acid gases a very large volume of water vapor is formed so that it is necessary to separate the water vapor from the acid gas before the acid gases can be further separated and refined. Since an alkaline metal carbonate solution normally is employed to absorb the acid gases from the fuel gas, the process has become known the "vacuum carbonate process."

In that part of the process wherein water vapor is separated from the acidic gases, three problems are encountered: first, the vacuum pump plugs up apparently due to polymer formation; second, small amounts of ammonia contaminate the separated gases; and third, high melting point hydrocarbons, such as naphthalene and phenanthrene clog up condenser lines. Although the concentration of the ammonia and high melting point hydrocarbons in the vapors leaving the actifier may be low, when the volume is reduced so greatly by the removal of water the concentration of these contaminants rapidly builds up in the residual acidic gases. The high melting-point-compounds precipitate in the tubes and parts of the condensers and ammonia-promoted polymer compounds act to clog piping and vapor passages that convey acid gases to the vacuum pump. It is important, therefore, that these contaminants be removed in order to permit an efficient separation of the water vapor from the acidic gases.

A disadvantage of the vacuum carbonate process, therefore, was that equipment used in refining the acidic gases was frequently rendered inoperative by contaminating compounds such as naphthalene and phenanthrene which clogged condenser tubes, valves and orifices. In addition, ammonia, that was fortuitously either continuously or periodically present in the actifier vapors, caused polymerization of constituents of the vapors to give reaction products that deposited in the condensers and thus led to obstruction of their vapor passageways. The problem of clogged condenser tubes, valves and other orifices was solved by Gollmar and is the subject of U. S. Patent 2,671,008 issued March 2, 1954.

By the process of the Gollmar patents ingredients which caused clogging of condenser tubes, valves and other orifices were removed from the vapors by the use of a comparatively small amount of solvents, resulting in operation without clogging of passageways of condensers and the like, and some improvement in vacuum pump operation because of removal of ammonia before the gas passed through the vacuum pump. However, while lines were clear from clogging by high melting point hydrocarbons, the problem of vacuum pump stoppage was not completely solved. In commercial installations wherein the vacuum carbonate process is employed it has still been necessary to shut down periodically to clean out the pump. By the practice of this invention shutdowns for this purpose are substantially eliminated.

This invention is based on the discovery that polymerization occurs in the pump itself by virtue of heat generated when the acid gases, at the high vacuum that is necessary to release them from the absorption solution in the actifier, are compressed to pressure required to propel them to the point of utilization. Hydrogen sulfide, and hydrogen cyanide passing through the pump, possibly with other contaminants, form hard polymers at temperatures resulting from a high pump compression ratio. In accordance with this invention when HCN is desired high compression ratios are reduced and, while there is some formation of liquid polymer, formation of hard polymers is substantially eliminated. In another aspect of the invention, particularly where HCN recovery is not desired pumps are eliminated.

Before the process of U. S. Patent 2,671,008 it was not practical to keep the hot-vacuum-actification plant operating at capacity because naphthalene would plug condensing equipment in less than one day's time. After employing the process of U. S. Patent 2,671,008 the hot-vacuum-actification plant could be operated at capacity in spite of naphthalene, phenanthrene and the like. However, the plant could not be operated continuously for periods longer than one or two months because of shutdowns that were necessary to remove polymer obstructions in and after the vacuum pump. Reducing the pump compression ratio in accordance with this invention has resulted in improved physical conditions and continuous operation for ten months, and there is no indication that the plant will have to be shut down for polymer removal in the future.

The various features of the invention are shown in the accompanying drawing which is illustrative only, and not limiting, inasfar as the invention is concerned.

The drawing is a diagrammatic flow sheet of the hot-vacuum-actification process and the apparatus employed in refining the actified vapors to separate them from water and contaminants.

Referring now to the figure of the drawing, coke oven gas which contains hydrogen sulfide, hydrogen cyanide, carbon dioxide, ammonia, phenanthrene, naphthalene and other constituents, is introduced into a scrubber 4 through an inlet pipe 2 and passes upwardly through the scrubber in counter-current circulation with an alkaline absorbing solution introduced into the top of the scrubber through a distributor 5. Preferably a mixture of sodium carbonate and sodium bicarbonate is used for absorbing the acid gases from the coke oven gas. The scrubbed coke oven gas leaves the top of the scrubber through an outlet 6. Fouled alkaline absorption liquid is drawn off from the bottom of the scrubber 4 by a pump 7 and is forced through a line 10 into a distributor 11 located in the top of an actifying tower 12.

In the actifying tower the fouled liquor is heated under a high vacuum of approximately 4 inches of mercury absolute pressure to drive off the constituents absorbed in the alkaline liquor in the scrubber. The alkaline liquor flows downwardly through the actifier 12 and is met with water vapors generated from the alkaline solution by heating coil 16. A very large amount of water is vaporized in the actifier and this water vapor flows upwardly through the actifier countercurrent to the alkaline solution to assist in releasing and stripping constituents absorbed by the alkaline solution in the scrubber. Revivified alkaline solution accumulates in the bottom of the actifier and is drawn off through a line 13 to a pump 14 and is then returned through a line 15 into the distributor 5 in the scrubber 4. Therefore the alkaline absorption solution is circulated in a closed cycle between the scrubber and the actifier in which the absorption solution is revivified. Since a large amount of water is removed in revivifying the alkaline solution, water is added to the revivified alkaline solution leaving the bottom of the actifier through a line 58, the water supplied through the line 58 being water that is condensed and separated from the actified vapors in the latter part of the refining operation, as will be hereinafter described.

The coke oven gas is delivered to the scrubber 4 in a heated condition which varies from 45° to 60° C. With the high partial vacuum in the actifier 12 (4 inches of mercury absolute) a temperature of approximately 55° C. exists in the actifier. Before the acidic gases are separated from the other actifier vapors all the actifier vapors are cooled to condense and separate the water therefrom. Accordingly the gases and vapors are passed through cooling condensers which are maintained under substantially the same pressure that exists in the actifier. The pressure in the actifier 12 may be varied between 3 to 9 inches of mercury absolute and the boiling temperature of the solution therein will vary accordingly.

Vapors leave the actifier through a vapor line 20 and enter a condenser 21 to be contracted in volume and to separate liquid water. In order to prevent the clogging of the condenser 21 due to precipitation of compounds such as naphthalene and phenanthrene in the form of solids, a solvent oil in the vapor form is introduced into the vapor line 20 in a manner to thoroughly mix the oil vapors with the actified vapors containing the water vapor.

An oil which has been found to be suitable for dissolving the high melting point hydrocarbons is a petroleum distillate which boils within the temperature range of 100° to 300° C. with the major portion boiling between 180° and 280° C. When the vapors of such an oil are mixed with the actifier vapors containing naphthalene and phenanthrene and the vapor mixture is subsequently cooled to condense water, the concentration of some of the naphthalene and phenanthrene vapors will be such that the vapors of oil, naphthalene and phenanthrene will condense together and the naphthalene and phenanthrene will be held in solution in the oil. This oil mixture will flow out of the condenser with the water so that the high-melting point hydrocarbons will not solidify to clog the condenser. As the water is condensed in the condensers the concentration of the high melting point hydrocarbon vapors in the acidic gases increases. At the same time the temperature of the vapors is gradually lowered in the condensers so that some high-melting point hydrocarbon vapors will be removed in each condenser. Oil for dissolving the contaminants is supplied to each vaporizer, through lines 43 and 53 and all condensed oil is collected and withdrawn from the system. This oil can be taken from a tank 47 and circulated through a line 50 by pump 51 into a vaporizer 52. The oil and water which is condensed in the condenser 21 is drawn off from the condenser through line 22 and passed into a separator 54. The oil and water stratify in the separator, the water being drawn off through a bottom line 55 and passed into a receiving tank 56, the oil being drawn off through line 57 to tank 60. This oil preferably is drawn off through a line 62 and may be used as fuel or for other purposes. The water collecting in the receiver 56 is preferably circulated back to the scrubber 4 to make up the dilute alkaline absorbing solution. This water is drawn off from the receiver 56 through the line 58 by the pump 59.

Heretofore a vacuum pump, such as pump 33 was deemed adequate for the entire system. Since the vacuum of about 4 inches mercury pressure absolute was readily maintained thereby, there was no apparent reason for modifying the pumping system. In accordance with this invention, however, steam jet evacuating means are provided in series with the vacuum pump to operate on vapors ahead of the pump. According to one embodiment of the invention condenser 21 is provided with a jet evacuator 66 communicating with both condenser 21 and actifier 12 and the required substantial vacuum is maintained in the condenser and actifier. Steam is delivered to jet evacuator 66 through line 67. The exhausted, mixed steam and gases, leaving the jet at about 75–80° C., are passed through a vapor line 24 into a scrubber 25. The vapors pass through the scrubber 25 at about this temperature countercurrent to a stream of water which is introduced into the condenser through a nozzle 26. The volume of water used is controlled to absorb sufficient ammonia to prevent resinification of the acid gases in the further treatment thereof while avoiding substantial absorption of hydrogen cyanide from the vapors. Water containing ammonia is removed from the scrubber through a line 27. When HCN is recovered the effective method of operating is to use a jet evacuator and a pump as set forth. In other instances two jet evacuators can be employed.

The acid vapors leaving the scrubber 25 will be substantially free of ammonia. This ammonia-free vapor flows through a line 28 into a second condenser 30 where the temperature is reduced to about 25° C. and the steam from the jet and water vapor remaining with the acid gases are condensed. As the vapors enter the condenser 30 oil vapors from the vaporizer 52 are introduced through a line 53 into the vapor line 28 to again supply oil vapors to be available for dissolving any naphthalene or phenanthrene in the vapors. The water and oil which are condensed in the condenser 30 flow through a line 22 to the separator 54 and these constituents are separated along with the water and oil removed from the condenser 21.

The vapors pass from the condenser 30 through a line 31 which connects with a trap 23 for trapping out any water or oil that may accompany the vapors. The trap 23 is connected with the condensate line 22. Vapors then pass out of the top of the trap 23 through a line 32 to a vacuum pump 33 where the pressure is raised to deliver the vapors through a vapor line 34 at a pressure of, say, 5 to 10 lbs. gauge.

Previously, in passing through the vacuum pump, the vapors were heated in the range of 100° to 150° C. However, since the institution of this invention, based on the discovery that this high pump temperature promotes polymerization in the vacuum pump and the line leading therefrom, the temperature of the $H_2S$ and HCN gases leaving the vacuum pump is now around 60° C. Gas vapors now flow through vacuum pump 33 and line 34 to condenser 35 without the formation of solid masses which tend to clog the pump and the line leading therefrom.

While it is not absolutely essential, the vapors are normally cooled in a condenser 35, for example, following the vacuum pump. When this is done, since some high melting point contaminants yet remain in the vapors, oil is introduced through a line 43 into the vapor line 34. The oil introduced into line 34 is of the same type oil that is vaporized in vaporizer 52, e. g. kerosene. This oil is introduced into a vaporizer 42 through a valved line 41 and live steam through a line 64 heats the oil.

The water and oil collecting in the condenser 35 are removed through a line 37 and pass into a separator 40. Water is removed from the bottom of the separator through a line 45 and passes to a drain. The oil flows from the separator 40 through a line 46 into a receiver 47. From receiver 47 the oil normally is withdrawn through discharge line 61 for purification or other use. However when only a small amount of high melting point contaminants separated in the condenser 35 is present the oil can be used for dissolving the high melting point contaminants passing through the condensers 21 and 30. In this instance the oil is supplied through the line 50 to the vaporizer 52.

The acid vapors, particularly hydrogen sulfide, hydrogen cyanide and carbon dioxide are delivered from the condenser 35 through a line 36 which may conduct the gases into the refining equipment for separating the constituents. The hydrogen cyanide is preferably dissolved in a large volume of cold water to be separated from the hydrogen sulphide and $CO_2$. The hydrogen cyanide may then be concentrated and separated from the water by distillation. The process and apparatus for separating the acid vapors is more particularly described and claimed in the patent to Mitchell, Hill and Gollmar, 2,419,225 issued April 22, 1947.

The above described process and apparatus is very effective in handling the problem of condensing a large volume of vapors of a liquid while also removing the vapors of solid contaminants therein which so seriously affect the operation of the equipment. In addition the invention as set forth herein is particularly adapted to the recovery of hydrogen cyanide. In connection with the embodiment of the invention illustrated in the drawing the steam jet evacuator while placed after the first condenser need not necessarily be interposed at that point so long as it is followed by a condenser to condense the steam by which it is operated. Thus, the steam jet evacuator can be placed before the condenser or after the ammonia scrubber 25, if one is employed. Thus, in accordance with this invention a reduction in the compression ratio of the vacuum actification pump has eliminated the excessive trouble in the vacuum pump and in lines carrying the recovered $H_2S$—HCN gases. The trouble could be overcome by too low a vacuum, but this would result in excessive steam costs to heat the actifier. In the case of coke oven gas it is desirable to operate the process at a fairly high vacuum (4 to 5 inches of mercury absolute) because at this vacuum the process can be operated with heat recovered from coke plant flushing liquor instead of steam from a boiler house.

As indicated hereinbefore, the process of this invention is in use commercially for the recovery of $H_2S$ and HCN from coke oven gas by hot-vacuum-actification. A plant which previously was shut down every month or two has operated without shutdown for over ten months. As a result of the steam jet evacuator employed according to this invention, the vacuum pump now runs at only 40–45 R. P. M. as compared with 180 R. P. M. before the modification of this invention, and the compression ratio is about 1 to 3 as compared to a previous ratio of about 1 to 12. The actification vacuum pump no longer operates at the excessively high compression ratio which generates sufficient heat to cause polymerization of actifier gases passing therethrough.

The effect of the use of a steam jet evacuator according to this invention on the efficiency of hydrogen cyanide recovery was believed to be a possible disadvantage of the invention. It was thought that condensing the large amount of steam from the $H_2S$ and HCN gases after the evacuator would cause the condensation and loss of HCN. On the contrary, tests showed that the loss from this cause was more than offset by a reduction in the amount of condensate from condenser 35, which previously contained HCN. Moreover, the larger quantity of steam now being condensed after the steam jet evacuator leads to a more efficient removal of ammonia and pyridine bases from the vapors before they enter the vacuum pump. Ammonia and pyridine bases, are undesirable because they tend to promote polymerization reactions in the system.

In the embodiment of the invention set forth in connection with the accompanying drawing the vacuum carbonate process is described in connection with a coke oven gas having a temperature of 50° to 65° C. The vacuum carbonate process is, however, also used to treat fuel gases having temperatures different from those described. The vacuum carbonate process is also applicable to fuel gases containing acid gases, but which are more free of contaminants. The formation of hard polymer in the vacuum pump occurs in either case, and is eliminated in accordance with this invention. Thus variations in the process hereinbefore set forth can be made without departing from the spirit and scope of the invention. With respect to changes in feed streams or temperatures, for instance, the vacuum carbonate process can be carried out if desired without utilizing an ammonia washer such as scrubber 25. Also instead of employing two vaporizers 42 and 52 for oil used in naphthalene treatment three (one for each condenser) desirably can be employed. Other modifications will of course occur to those skilled in the art and such modifications are within the contemplation of this invention.

The invention claimed is:

1. In the recovery of hydrogen sulfide and hydrogen cyanide from a fuel gas by a hot vacuum actification process comprising recirculating an aqueous alkaline absorbent solution in a closed cycle between a scrubber in which the gas is scrubbed by the solution and an actifier in which the solution is regenerated by heating at subatmospheric pressures, passing the vapors discharged from said actifier through condensing equipment in which said vapors are cooled and also passing said vapors through a vacuum pump, said vapors having a tendency to form hard polymers in said pump, the improvement wherein steam jet evacuating means are provided in series with said vacuum pump so as to operate on said vapors ahead of said vacuum pump and the temperature of said vapors leaving said pump is controlled at about 60° C. by operating said pump at a compression ratio of about 1:3 to substantially eliminate the formation of said polymers in said pump.

2. In the recovery of hydrogen sulfide and hydrogen cyanide from coal carbonization gas by a hot vacuum actification process comprising recirculating an aqueous alkaline absorbent solution in a closed cycle between a scrubber in which the gas is scrubbed by the solution and an actifier in which the solution is regenerated by heating at subatmospheric pressures, passing said actifier vapors discharged from said actifier through a plurality of condensers in series in each of which said vapors are cooled and also passing said vapors through a vacuum pump located intermediate two of said condensers, and thereafter recovering acidic gases, said vapors being subject to the forming of hard polymers in said pump, the improvement comprising delivering steam and actifier vapors to a steam jet evacuator and therein mixing said vapors with steam, exhausting the mixture of steam and vapors therefrom, passing the mixture to one of the condensers to condense the steam from said mixture and passing remaining actifier vapors through the vacuum pump while controlling the temperature of said vapors leaving said pump at about 60° C. by operating said pump at a compression ratio of about 1:3, thereby substantially eliminating the formation of said polymers in said pump.

3. In a process for treating actifier gases from a vacuum carbonate process for the recovery of hydrogen sulfide and hydrogen cyanide from coke oven gas which has been processed to remove therefrom most of the ammonia and part of the vapors of naphthalene and similar compounds originally present therein, said actification process comprising the steps of recirculating an aqueous alkaline metal carbonate absorbent solution in a closed cycle between a scrubber in which the gas is scrubbed by the solution and an actifier in which the solution is regenerated by heating at subatmospheric pressure together with a plurality of condensers in series in each of which the vapors are cooled and also passing said vapors through a vacuum pump located intermediate two of said condensers, and thereafter recovering said acidic gases, said vapors being subject to the formation of hard polymers in said pump, the improvement comprising passing vapors from said actifier to a first condenser provided with a steam jet evacuator communicating with both the condenser and the actifier, continuously withdrawing vapors from said first condenser by means of said steam jet evacuator, maintaining a substantial vacuum in the condenser and artificer and subsequently passing the vapors through a second condenser and the vacuum pump while controlling the temperature of said vapors leaving said pump at about 60° C. by operating said pump at a compression ratio of about 1:3, thereby substantially eliminating the formation of said polymers in said pump.

References Cited in the file of this patent

UNITED STATES PATENTS

| | | |
|---|---|---|
| 1,533,773 | Sperr | Apr. 14, 1925 |
| 1,578,687 | Sperr | Mar. 30, 1926 |
| 1,785,365 | Seil | Dec. 16, 1930 |
| 1,799,177 | Perry | Apr. 7, 1931 |
| 2,615,786 | Proell | Oct. 28, 1952 |
| 2,671,008 | Gollmar | Mar. 2, 1954 |

UNITED STATES PATENT OFFICE

CERTIFICATE OF CORRECTION

Patent No. 2,837,399                                    June 3, 1958

Herbert A. Gollmar et al.

It is hereby certified that error appears in the printed specification of the above numbered patent requiring correction and that the said Letters Patent should read as corrected below.

Column 1, lines 41 and 42, for "known the" read -- known as the --;

column 7, line 17, for "artificer" read -- actifier --.

Signed and sealed this 9th day of September 1958.

(SEAL)
Attest:

KARL H. AXLINE
Attesting Officer

ROBERT C. WATSON
Commissioner of Patents